(12) United States Patent
Sakai et al.

(10) Patent No.: US 10,125,813 B2
(45) Date of Patent: Nov. 13, 2018

(54) MOTION GUIDE APPARATUS

(71) Applicant: THK CO., LTD., Tokyo (JP)

(72) Inventors: Junichi Sakai, Tokyo (JP); Kaoru Hoshide, Tokyo (JP); Shigeo Tomita, Tokyo (JP); Yuki Nakamura, Tokyo (JP); Nobuyuki Maki, Tokyo (JP); Muten Iwamoto, Tokyo (JP); Kazuya Horike, Tokyo (JP); Kenji Narata, Tokyo (JP); Katsunori Yamamura, Tokyo (JP); Fukuji Nakano, Tokyo (JP); Shigemi Nakamura, Tokyo (JP); Yosuke Irie, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/560,051

(22) PCT Filed: Mar. 10, 2016

(86) PCT No.: PCT/JP2016/057541
§ 371 (c)(1),
(2) Date: Sep. 20, 2017

(87) PCT Pub. No.: WO2016/163202
PCT Pub. Date: Oct. 13, 2016

(65) Prior Publication Data
US 2018/0073558 A1 Mar. 15, 2018

(30) Foreign Application Priority Data

Apr. 9, 2015 (JP) ................. 2015-079914

(51) Int. Cl.
*F16C 29/06* (2006.01)
(52) U.S. Cl.
CPC .......... *F16C 29/0607* (2013.01); *F16C 29/06* (2013.01); *F16C 29/0633* (2013.01)

(58) Field of Classification Search
CPC .............. F16C 29/0607; F16C 29/0633; F16C 29/0635
See application file for complete search history.

(56) References Cited

U.S. PATENT DOCUMENTS 5,758,975 A 6/1998 Kuo
6,132,093 A * 10/2000 Michioka ............ F16C 29/0607
384/45

(Continued)

FOREIGN PATENT DOCUMENTS

CN 1197505 A 10/1998
CN 1380949 A 11/2002

(Continued)

OTHER PUBLICATIONS

Office Action dated Sep. 4, 2017, issued in counterpart Taiwanese Application No. 105111031. (3 pages).

(Continued)

*Primary Examiner* — James Pilkington
(74) *Attorney, Agent, or Firm* — Westerman, Hattori, Daniels & Adrian, LLP

(57) ABSTRACT

A motion guide apparatus ensures that a retaining portion retains a rolling element. A rolling element retainer having retaining portions that prevent a rolling element from falling out of a movable body, the retaining portions extending along a loaded rolling element rolling portion, is incorporated in the movable body of the motion guide apparatus. End plates are formed integrally with the retaining portions. Fall prevention portions to reduce the widths of openings between the retaining portions are provided to center parts of the retaining portions in a length direction thereof. The fall prevention portions are padding portions integrated with the retaining portions, the padding portions rising in such a manner as to reduce the widths of the openings, and/or projections integrated with the retaining portions, the pro- (Continued)

jections touching the movable body in such a manner that the center parts of the retaining portions bend toward a track member.

10 Claims, 11 Drawing Sheets

(56) References Cited

U.S. PATENT DOCUMENTS

| | | | |
|---|---|---|---|
| 6,217,217 B1 | 4/2001 | Teramachi | |
| 7,377,693 B2 * | 5/2008 | Tsai | F16C 29/0607 |
| | | | 384/43 |
| 9,068,601 B2 * | 6/2015 | Mizumura | F16C 33/6659 |
| 9,581,194 B2 * | 2/2017 | Maki | F16C 29/0609 |
| 2002/0136472 A1 | 9/2002 | Mochizuki et al. | |
| 2007/0076989 A1 | 4/2007 | Matsumoto et al. | |
| 2007/0201776 A1 | 8/2007 | Tsai et al. | |

FOREIGN PATENT DOCUMENTS

| | | |
|---|---|---|
| CN | 1497193 A | 5/2004 |
| DE | 20 2013 104 521 U1 | 10/2013 |
| EP | 1403541 A1 | 3/2004 |
| JP | 10-281153 A | 10/1998 |
| JP | 2007-239829 A | 9/2007 |
| JP | 2008-128384 A | 6/2008 |
| JP | 2008-223878 A | 9/2008 |
| TW | 200728622 A | 8/2007 |

OTHER PUBLICATIONS

Notification of Reason(s) for Refusal dated Aug. 16, 2016, issued in counterpart Japanese application No. 2015-079914, with English translation (8 pages).

Decision to Grant a Patent dated Oct. 18, 2016, issued in counterpart Japanese application No. 2015-079914, with English translation (6 pages).

International Search Report dated Jun. 7, 2016, issued in counterpart International Application No. PCT/JP2016/057541 (1 page).

Office Action dated Aug. 6, 2018, issued in counterpart Chinese application No. 201680019919.2, with English translation. (11 pages).

* cited by examiner

CROSS SECTIONAL VIEW ALONG III-III

ENLARGED VIEW OF PART V

MOTION GUIDE APPARATUS

FIELD

The present invention relates to a motion guide apparatus that guides the motion of a movable member such as a table by using the rolling motion of a rolling element.

BACKGROUND

This type of motion guide apparatus includes a track rail and a block assembled via a rolling element to the track rail in such a manner as to be movable in a length direction of the track rail. A rolling element rolling portion extending in the length direction is formed on the track rail. A loaded rolling element rolling portion facing the rolling element rolling portion of the track rail is formed on the block. A plurality of rolling elements is placed between the rolling element rolling portion of the track rail and the loaded rolling element rolling portion of the block in such a manner as to be capable of rolling motion. When the block moves relatively to the track rail in the length direction, the rolling elements between the block and the track rail perform rolling motion. Light movement of the movable member such as a table attached to the block can be obtained by using the rolling motion of the rolling elements.

A rolling element retainer to prevent the rolling elements from falling off is incorporated in the block (refer to Patent Literature 1). The rolling element retainer includes retaining portions extending in the length direction along the loaded rolling element rolling portion of the block. If the rolling element is a ball, the width of an opening between the retaining portions is set to be smaller than the diameter of the ball. The rolling element retainer holds the rolling element with the retaining portions and accordingly prevents the rolling element from falling out of the block.

CITATION LIST

Patent Literature

Patent Literature 1: JP 2008-223878 A

SUMMARY OF INVENTION

Technical Problem

However, if the rolling element retainer is made of resin, a warp or a distortion may occur in the retaining portion depending on molding conditions (such as the position of a gate and the position of an ejector) and the shape of a cross section of the retaining portion. If a warp or a distortion occurs in the retaining portion, the width of the opening between the retaining portions maybe further increased in a center part of the retaining portion in the length direction and the rolling element may fall out of the retaining portions.

Hence, an object of the present invention is to provide a motion guide apparatus that ensures that a retaining portion retains rolling elements.

Solution to Problem

In order to solve the problem, an aspect of the present invention is a motion guide apparatus including a track member having a rolling element rolling portion extending in a length direction, a movable body, having a loaded rolling element rolling portion facing the rolling element rolling portion of the track member, to be assembled to the track member in such a manner as to be movable in the length direction, a plurality of rolling elements placed between the track member and the loaded rolling element rolling portion of the movable body in such a manner as to be capable of rolling motion, and a rolling element retainer incorporated in the movable body, the rolling element retainer having at least one retaining portion, extending along the loaded rolling element rolling portion, to prevent the rolling elements from falling out of the movable body, the motion guide apparatus including a fall prevention portion in a center part of the retaining portion in the length direction, configured to reduce a width of an opening between the retaining portions or between the retaining portion and the movable body.

Advantageous Effects of Invention

According to the present invention, the fall prevention portion to reduce the width of the opening between the retaining portions or between the retaining portion and the movable body is provided to the center part of the retaining portion in the length direction. Accordingly, even if the retaining portion warps or distorts depending on molding conditions, it is possible to prevent an increase in width of the opening and retain the rolling elements by the retaining portion.

DETAILED DESCRIPTION OF EMBODIMENTS

A motion guide apparatus of one embodiment of the present invention is described in detail hereinafter with reference to the accompanying drawings. However, the motion guide apparatus of the present invention can be embodied in various modes, and is not limited to embodiments described in the description. The embodiment is provided with the intention of enabling those skilled in the art to fully understand the scope of the invention by sufficient disclosure of the description.

Figure 1:
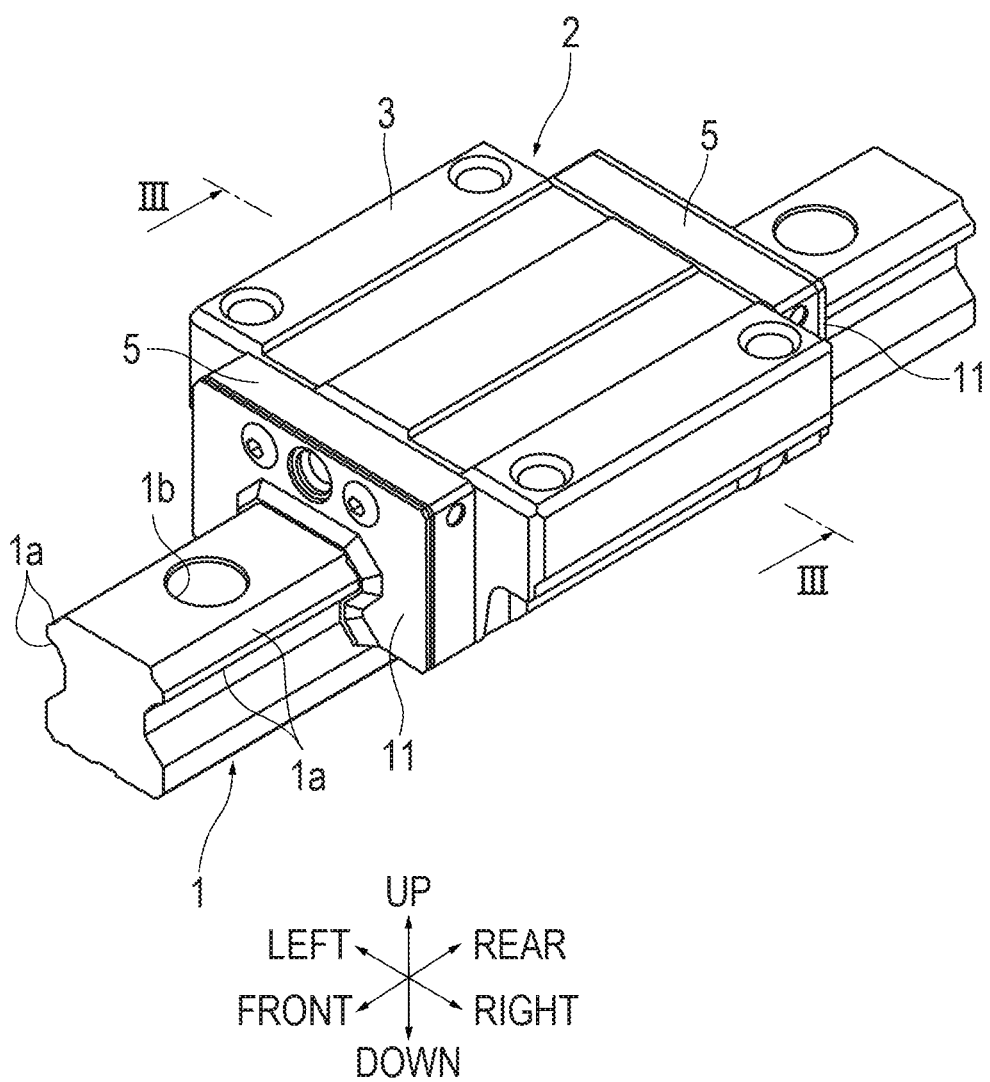
FIG. 1 is an external perspective view of a motion guide apparatus of a first embodiment of the present invention.

FIG. 1 illustrates a perspective view of the motion guide apparatus of the embodiment. For the sake of description, directions when a track rail 1 is placed on a horizontal plane and viewed from a length direction, that is, an up-and-down direction, a front-and-rear direction, and a left-and-right direction, which are illustrated in FIG. 1, are used below to describe the configuration of the motion guide apparatus. The orientation of the motion guide apparatus is not naturally limited to such an orientation.

The motion guide apparatus includes the track rail 1 as a track member, and a block 2 as a movable body assembled via rolling elements to the track rail 1 in such a manner as to be slidable in a longitudinal direction of the track rail 1. Multiple balls 6 (refer to FIG. 3) are placed as the rolling elements between the track rail 1 and the block 2 in such a manner as to be capable of rolling motion. The undersurface of the track rail 1 is attached to an unillustrated base or the like. The top surface of the block 2 is attached to a movable member such as an unillustrated table.

The top surface of the track rail 1 has through-holes 1b for inserting a bolt at predetermined spacings in the length direction. Each of left and right side surfaces of the track rail 1 has two ball rolling grooves 1a as upper and lower rolling element rolling portions along the length direction.

The block 2 is assembled to the track rail 1 in such a manner as to be movable in the length direction of the track rail 1. As illustrated in an exploded perspective view of the block 2 of FIG. 2, the block 2 includes a block body 3, ball retainers 4 as rolling element retainers, and lid members 5 placed on both sides of the ball retainers 4 in a travel direction (a travel direction with respect to the track rail 1). The ball retainer 4 is, for example, a resin molded product, and is formed integrally with end plates 4a placed on both end surfaces of the block body 3 in the travel direction (the length direction of the track rail 1), and a retaining portion 4b extending along the longitudinal direction of the block body 3. As illustrated in FIG. 1, an end seal 11 is placed on an end surface of the lid member 5 in the travel direction (the travel direction with respect to the track rail 1).

Figure 3:
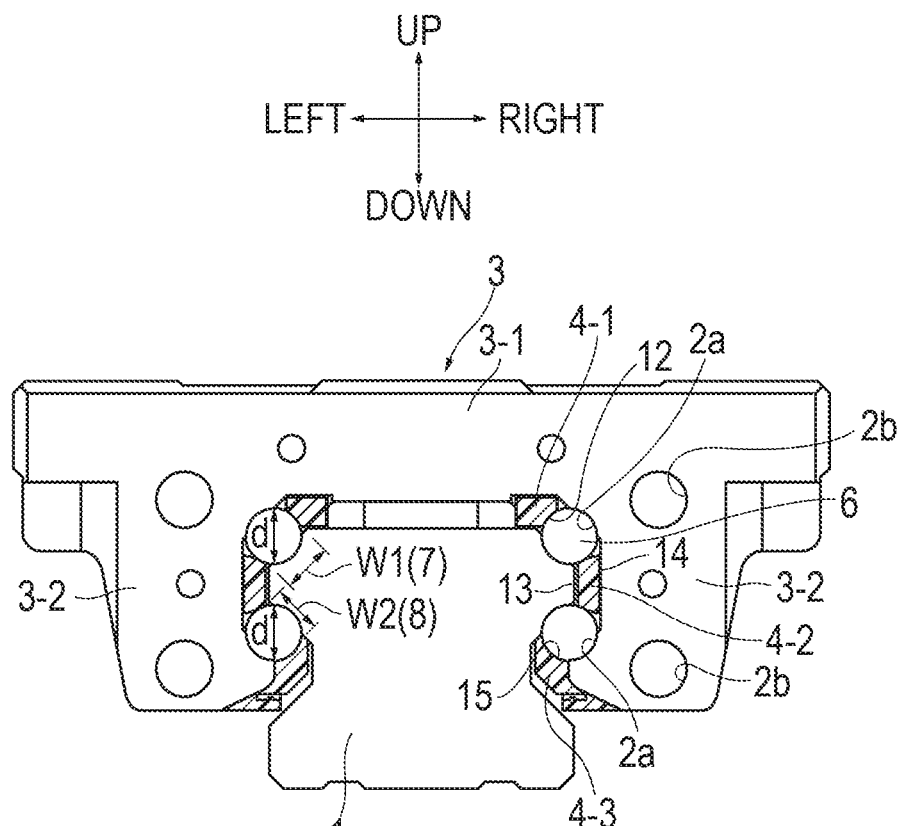
FIG. 3 is a cross-sectional view taken along line III-III of FIG. 1.

As illustrated in a cross-sectional view of FIG. 3, the block body 3 made of metal includes a center part 3-1 facing the top surface of the track rail 1, and a pair of sleeve portions 3-2 facing the left and right side surfaces of the track rail 1. The entire block body 3 is formed in a saddle shape. An inner surface of each of the left and right sleeve portions 3-2 of the block body 3 has two loaded ball rolling grooves 2a as upper and lower loaded rolling element rolling portions each facing the ball rolling groove 1a of the track rail 1. The block body 3 has ball return paths 2b as rolling element return paths that are equal in number to the number of the loaded ball rolling grooves 2a and are parallel to the loaded ball rolling grooves 2a. The ball return path 2b comprises a through-hole opened in the block body 3 in the longitudinal direction.

Figure 2:
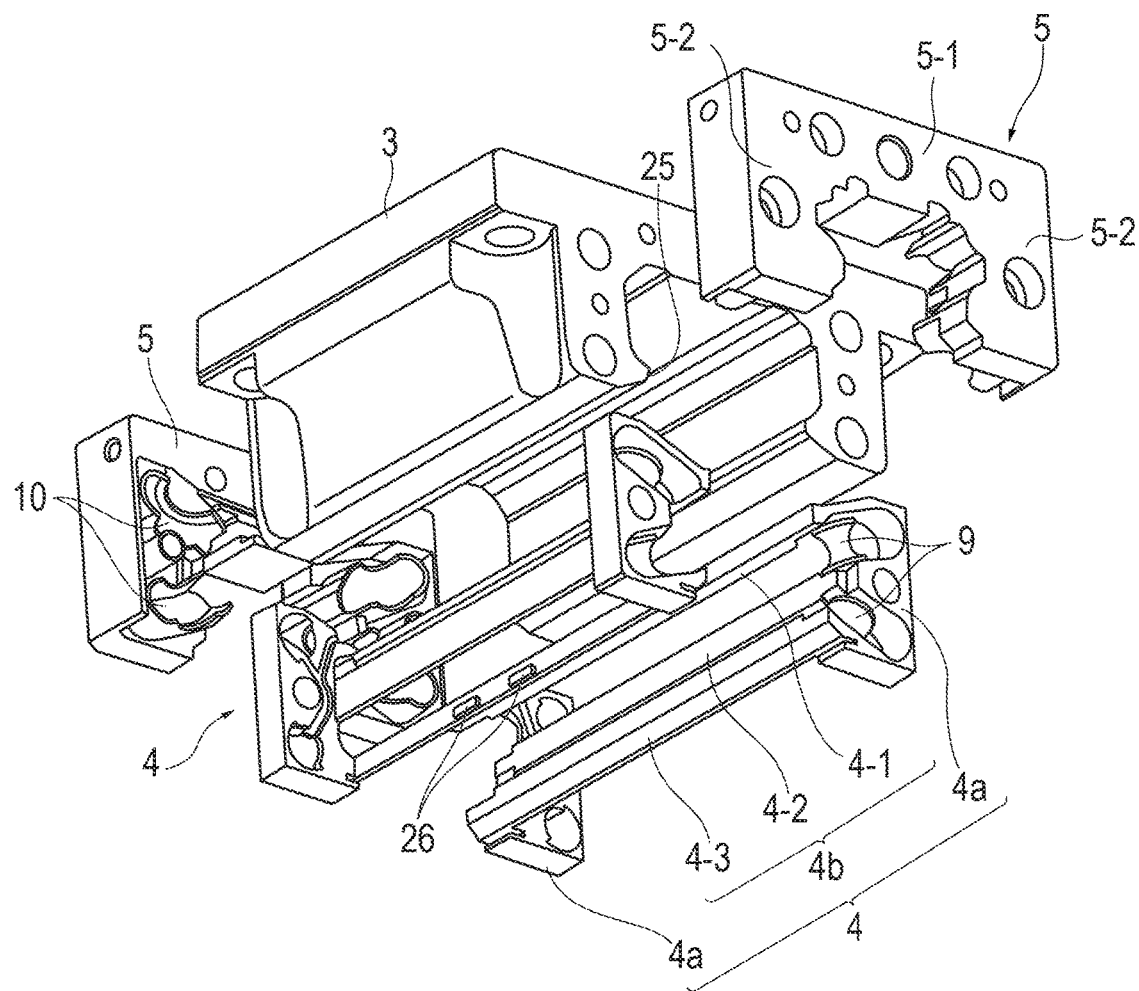
FIG. 2 is an exploded perspective view of a block of the motion guide apparatus of the first embodiment of the present invention.

As illustrated in FIG. 2, two ball retainers 4 are incorporated in the inner side surfaces of the sleeve portions 3-2 of the block body 3. The retaining portion 4b of the ball retainer 4 extends along the loaded ball rolling groove 2a, and prevents the balls 6 from falling out of the block 2 when the block 2 is removed from the track rail 1. As illustrated in the cross-sectional view of FIG. 3, the retaining portion 4b includes an upper retaining portion 4-1 placed above the upper loaded ball rolling groove 2a, a middle retaining portion 4-2 placed between the two—upper and lower—loaded ball rolling grooves 2a, and a lower retaining portion 4-3 placed below the lower loaded ball rolling groove 2a.

Figure 5:
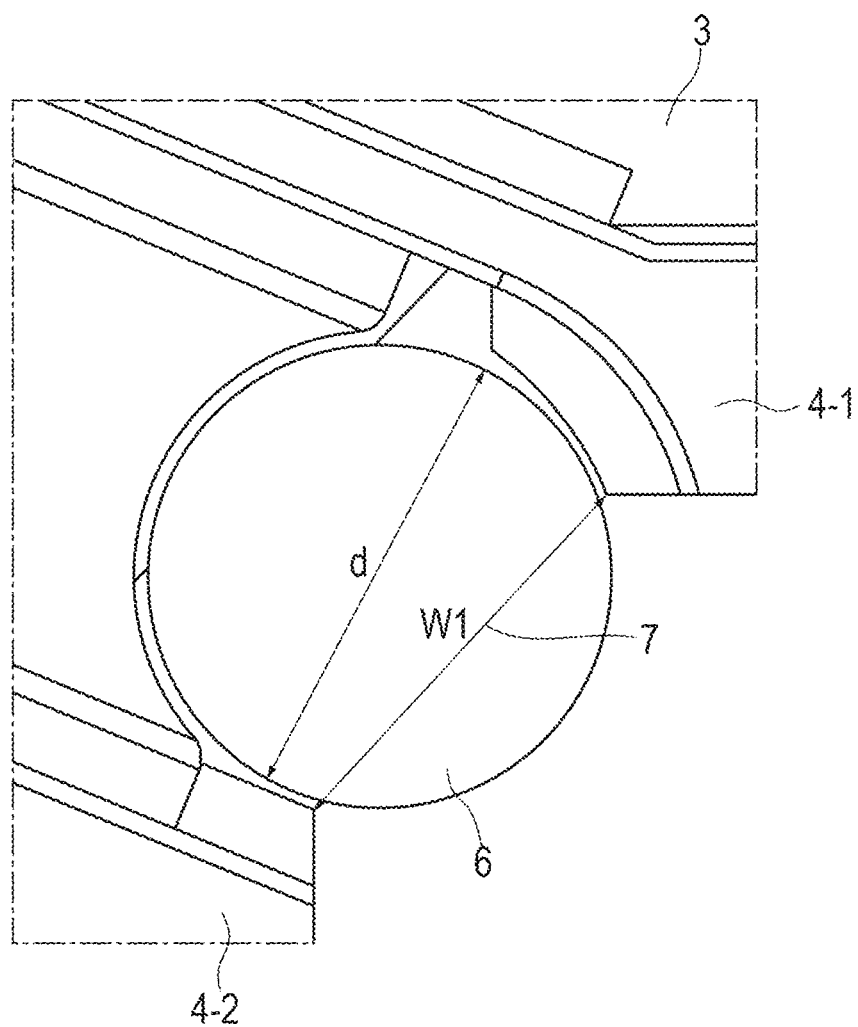
FIG. 5 is an enlarged view of a part V of FIG. 4.

The shape of a cross section of the upper retaining portion 4-1 is a substantially rectangular shape. A corner, facing the ball 6, of the upper retaining portion 4-1 has a groove 12 with an arc-shaped cross section fitting the ball 6. The shape of a cross section of the middle retaining portion 4-2 is a substantially trapezoidal shape. The middle retaining portion 4-2 has arc-shaped grooves on the ball 6 side thereof. The shape of a cross section of the lower retaining portion 4-3 is formed into a shape fitting a space between the track rail 1 and the block body 3. A portion, facing the ball 6, of the lower retaining portion 4-3 has an arc-shaped groove 15 fitting the ball 6. A width W1 of an opening 7 (refer to FIG. 5) between the upper retaining portion 4-1 and the middle retaining portion 4-2 is smaller than a diameter d of the ball 6 to be able to prevent the ball 6 from falling off. Similarly a width W2 of an opening 8 between the middle retaining portion 4-2 and the lower retaining portion 4-3 is smaller than the diameter d of the ball 6. The balls 6 are partially exposed from the openings 7 and 8 to touch the ball rolling grooves 1a of the track rail 1.

As illustrated in FIG. 2, the end plate 4a formed integrally with the retaining port ion 4b is famed in a substantially rectangular shape. A pair of upper and lower inner turn-around paths 9 is famed integrally with each of the left and right end plates 4a. The inner turn-around path 9 configures an inner side of a U-shaped turn-around path connecting the loaded ball rolling groove 2a and the ball return path 2b of the block body 3. The inner turn-around path 9 can also be made a separate body from the end plate 4a, and fitted in the end plate 4a.

The lid member 5 includes a center part 5-1 facing the top surface of the track rail 1, and a pair of sleeve portions 5-2 facing the side surfaces of the track rail 1. Each of the left and right sleeve portions 5-2 is provided with a pair of upper and lower outer turn-around paths 10. The outer turn-around path 10 is in a concave-convex fit to the inner turn-around path 9 of the end plate 4a to configure a U-shaped turn-around path 2c (refer to FIG. 6) in cooperation with the inner turn-around path 9.

Figure 4:
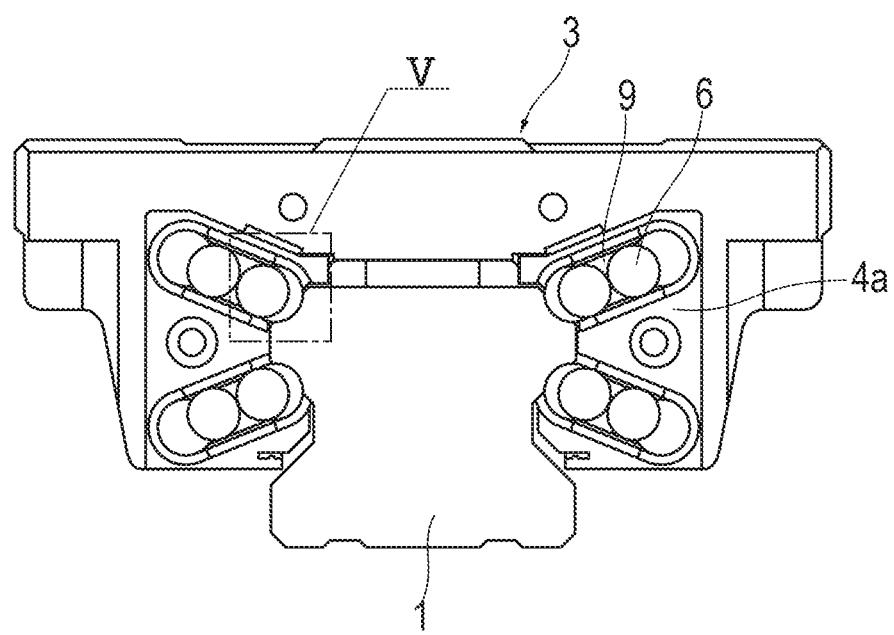
FIG. 4 is a front view of the motion guide apparatus of the first embodiment of the present invention (a state where a lid member has been removed).

As illustrated in FIG. 3, the plurality of balls 6 is placed between the ball rolling groove 1a of the track rail 1 and the loaded ball rolling groove 2a of the block body 3 in such a manner as to be capable of rolling motion. The balls 6 are placed both in the ball return path 2b and in the inner turn-around path 9 as illustrated in FIG. 4. The motion guide apparatus is, for example, what is called a full-ball type, and does not include a spacer between adjacent balls 6.

Figure 6:
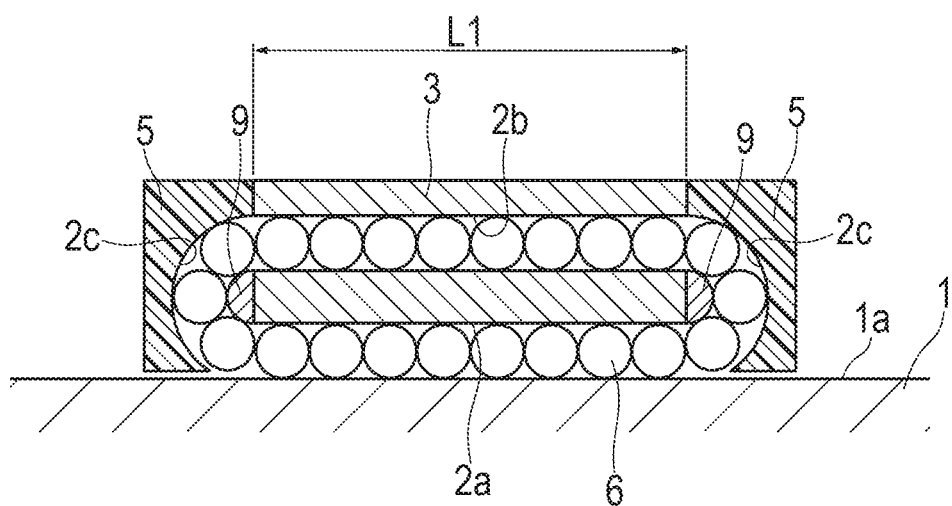
FIG. 6 is a cross-sectional view of a ball circulation path of the block of the motion guide apparatus of the first embodiment of the present invention.

FIG. 6 illustrates a circulation path of the block 2. The circulation path includes a loaded ball rolling path having the ball rolling groove 1a of the track rail 1 and the loaded ball rolling groove 2a of the block body 3, the ball return path 2b parallel to the loaded ball rolling path, and the U-shaped turn-around paths 2c linking the loaded ball rolling path and the ball return path 2b. As described above, the inner side of the turn-around path 2c is famed by the inner turn-around path 9 of the end plate 4a. The outer side of the turn-around path 2c is formed by the outer turn-around path 10 of the lid member 5.

Figure 7:
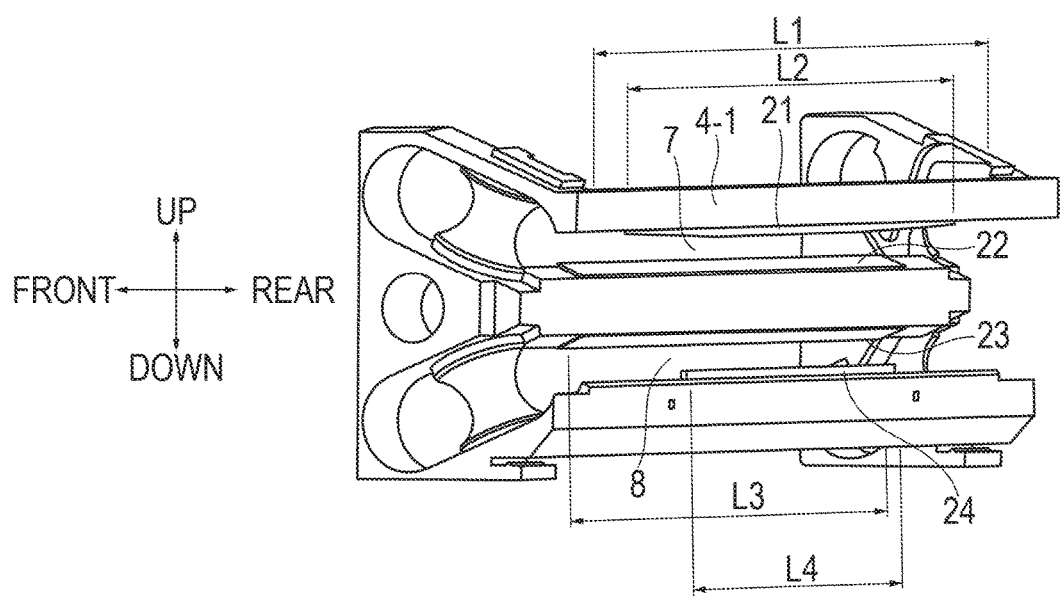
FIG. 7 is a perspective view of a ball retainer of the motion guide apparatus of the first embodiment of the present invention.

As illustrated in a perspective view of the ball retainer 4 of FIG. 7, a center part of the upper retaining portion 4-1 in the length direction (the front-and-rear direction of FIG. 7) is provided integrally with a padding portion 21 as a fall prevention portion that rises in such a manner as to reduce the width of the opening 7 between the upper retaining portion 4-1 and the middle retaining portion 4-2. The padding portion 21 is formed in a part defining the opening 7 and at the lower end of the upper retaining portion 4-1. In this example, the padding portion 21 is famed in a tapered or arc surface, the center of which in the length direction rises highest. The shape of the padding portion 21 is not particularly limited and is determined in accordance with a warp or distortion of the upper retaining portion 4-1 in such a manner as to prevent the balls 6 from falling out of the opening 7. The padding portion 21 is formed in a center part L2 in the length direction within a part L1 (refer also to FIG. 6), which is along the loaded ball rolling groove 2a, of the upper retaining portion 4-1. This is because when the padding portion 21 is famed along the entire length L1 of the upper retaining portion 4-1 in the length direction, the upper retaining portion 4-1 interferes with the ball 6 at an end of the upper retaining portion 4-1 in the length direction and accordingly the upper retaining portion 4-1 hinders the smooth rolling motion of the ball 6. Moreover, it is possible to ensure compensation for a largely distorted part by providing the padding portion 21 to the center part L2 in the length direction.

A center part of the middle retaining portion 4-2 in the length direction is also provided integrally with a padding portion 22 that rises in such a manner as to reduce the width of the opening 7 between the upper retaining portion 4-1 and the middle retaining portion 4-2, and a padding portion 23 that rises in such a manner as to reduce the width of the opening 8 between the middle retaining portion 4-2 and the lower retaining portion 4-3. The padding port ions 22 and 23 are formed on opposite upper and lower sides of the middle retaining portion 4-2, that is, in parts defining the widths of the openings 7 and 8. Moreover, the padding portions 22 and 23 are formed in a center part L3 in the length direction within the part L1, which is along the loaded ball rolling groove 2a, of the middle retaining portion 4-2. In this example, the padding portions 22 and 23 are famed in a step that rises evenly highest in the length direction. However, the shapes of the padding portions 22 and 23 are not particularly limited.

A center part of the lower retaining portion 4-3 in the length direction is also provided integrally with a padding portion 24 that rises in such a manner as to reduce the width of the opening 8 between the middle retaining portion 4-2 and the lower retaining portion 4-3. The padding portion 24 is formed in a part defining the width of the opening 8 and at the upper end of the lower retaining portion 4-3. The padding portion 24 is famed only in a center part L4 in the length direction within the part L1, which is along the loaded ball rolling groove 2a, of the lower retaining portion 4-3. In this example, the padding portion 24 is famed in a step that rises evenly in the length direction. However, the shape of the padding portion 24 is not particularly limited.

As illustrated in FIG. 2, a projection 26 as the fall prevention portion that touches an inner surface 25 of the block body 3 is formed integrally with the center part of the lower retaining portion 4-3 in the length direction in such a manner that the center part of the lower retaining portion 4-3 bends toward the track rail 1. The shape of the projection 26 is not particularly limited, and can be set in various shapes such as a square and a round. The number of the projections 26 is not particularly limited, either, and can be set to one, two, three, and so forth. The location where the projection 26 is famed is not limited to the lower retaining portion 4-3, and may be provided to at least one of the upper retaining portion 4-1, the middle retaining portion 4-2, and the lower retaining portion 4-3.

Figure 8:
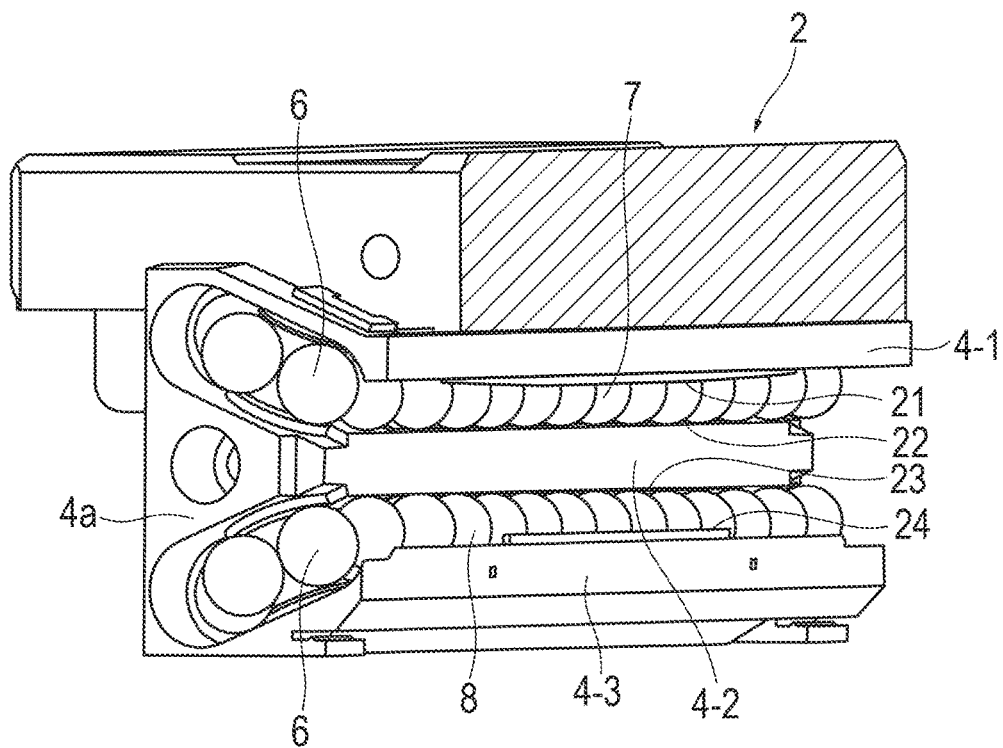
FIG. 8 is a perspective view of the block of the motion guide apparatus of the first embodiment of the present invention (a state where balls have been loaded).

The motion guide apparatus of the embodiment exerts the following effects: FIG. 8 illustrates a state where the balls 6 have been loaded in the block 2. The center parts of the upper retaining portion 4-1, the middle retaining portion 4-2, and the lower retaining portion 4-3 in the length direction are provided with the padding portions 21, 22, 23, and 24. Accordingly, even if a warp or distortion occurs in the upper retaining portion 4-1, the middle retaining portion 4-2, and the lower retaining portion 4-3 depending on the molding conditions, it is possible to prevent the widths of the openings 7 and 8 from becoming larger than the diameter of the ball 6 and prevent the balls 6 from falling off.

The upper retaining portion 4-1, the middle retaining portion 4-2, and the lower retaining portion 4-3 are famed integrally with the end plates 4a. Accordingly, the ball retainer 4 resistant to twist can be obtained. Moreover, the ball retainer 4 is provided with the middle retaining portion 4-2 to eliminate the necessity to provide a middle retaining portion to the block body 3 and also simplify the processing of the block body 3. If the upper retaining portion 4-1, the middle retaining port ion 4-2, and the lower retaining portion 4-3 are formed integrally with the end plates 4a, warps of the upper retaining portion 4-1, the middle retaining portion 4-2, and the lower retaining portion 4-3 may be different due to differences in cross-sectional shape between the upper retaining portion 4-1, the middle retaining portion 4-2, the lower retaining portion 4-3, and the end plate 4a. The upper retaining portion 4-1, the middle retaining portion 4-2, and the lower retaining portion 4-3 are provided with the padding portions 21, 22, 23, and 24. Accordingly, it is possible to handle a warp of each of the upper retaining portion 4-1, the middle retaining portion 4-2, and the lower retaining portion 4-3.

As illustrated in FIG. 2, when the ball retainers 4 are incorporated in the block body 3 and the lid members 5 are fastened by screws to the block body 3, the upper retaining portion 4-1, the middle retaining portion 4-2, and the lower retaining portion 4-3 may bend due to a space between the end plate 4a of the ball retainer 4 and the block body 3. The projection 26 is provided to at least one of the upper retaining portion 4-1, the middle retaining portion 4-2, and the lower retaining portion 4-3. Accordingly, it is possible to control bending and correct a bend that cannot be handled by the padding portions 21, 22, 23, and 24 alone.

Figure 9:
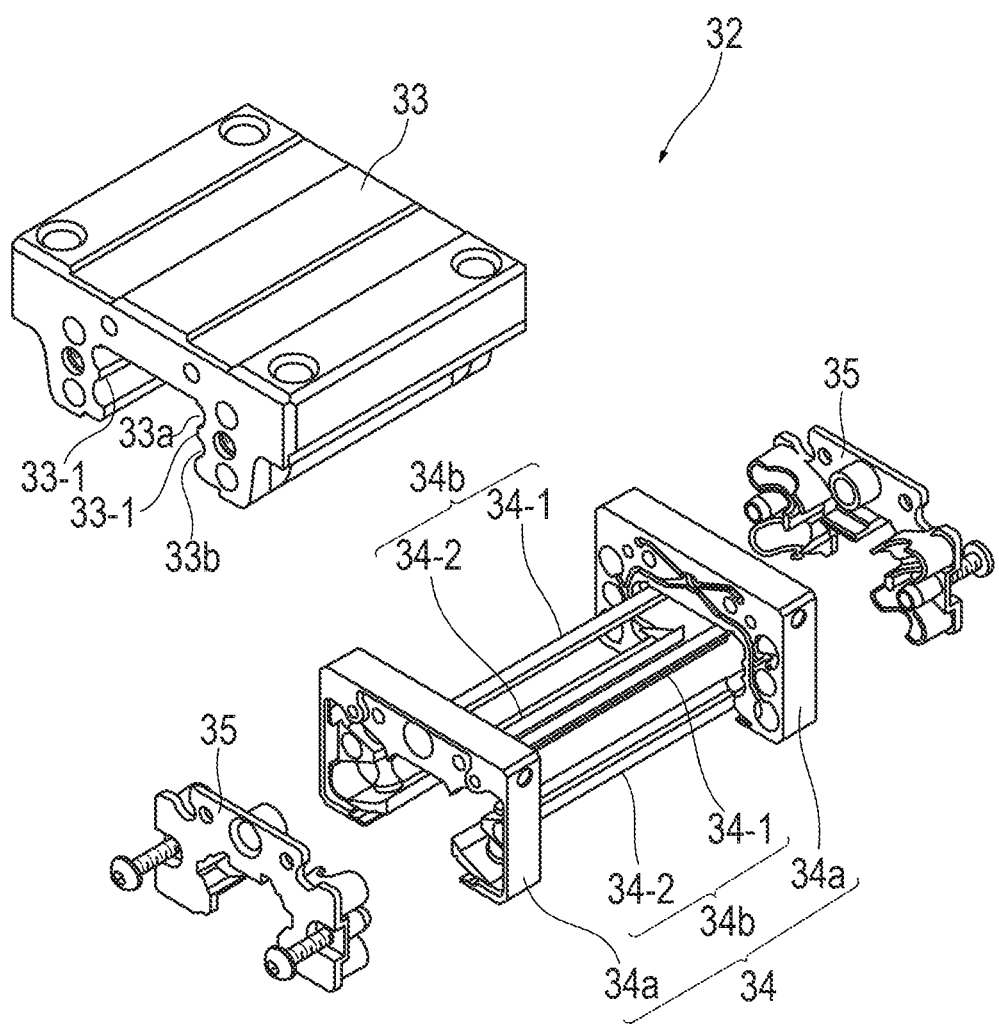
FIG. 9 is an exploded perspective view of a block of a motion guide apparatus of a second embodiment of the present invention.
Figure 9:
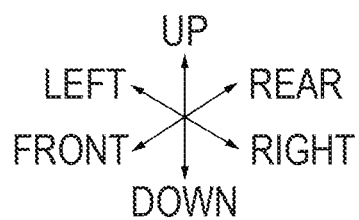

FIG. 9 illustrates an exploded perspective view of a block of a motion guide apparatus of a second embodiment of the present invention. As in the motion guide apparatus of the first embodiment, a block 32 includes a block body 33, a ball retainer 34 where end plates 34a placed on both end surfaces of the block body 33 in a travel direction (a travel direction with respect to the track rail) and retaining portions 34b are integrally molded, and lid members 35 placed on both sides of the end plates 34a of the ball retainer 34 in the travel direction. This embodiment is different from the motion guide apparatus of the first embodiment in the respect that the ball retainer 34 consists of one component, in the respect that the ball retainer 34 is not provided with a middle retaining portion and a middle retaining portion 33-1 is provided to the block body 33, and in the respect that the lid member 35 is incorporated in the end plate 34a of the ball retainer 34.

Each of the left and right retaining portions 34b of the ball retainer 34 includes a pair of an upper retaining portion 34-1 and a lower retaining portion 34-2 on the upper and lower sides thereof. The upper retaining portion 34-1 is placed above an upper loaded ball rolling groove 33a of the block body 33. The lower retaining portion 34-2 is placed below a lower loaded ball rolling groove 33b of the block body 3. Each of the upper retaining portion 34-1 and the lower retaining portion 34-2 prevents balls from falling off in corporation with the middle retaining portion 33-1 of the block body 33.

Figure 10:
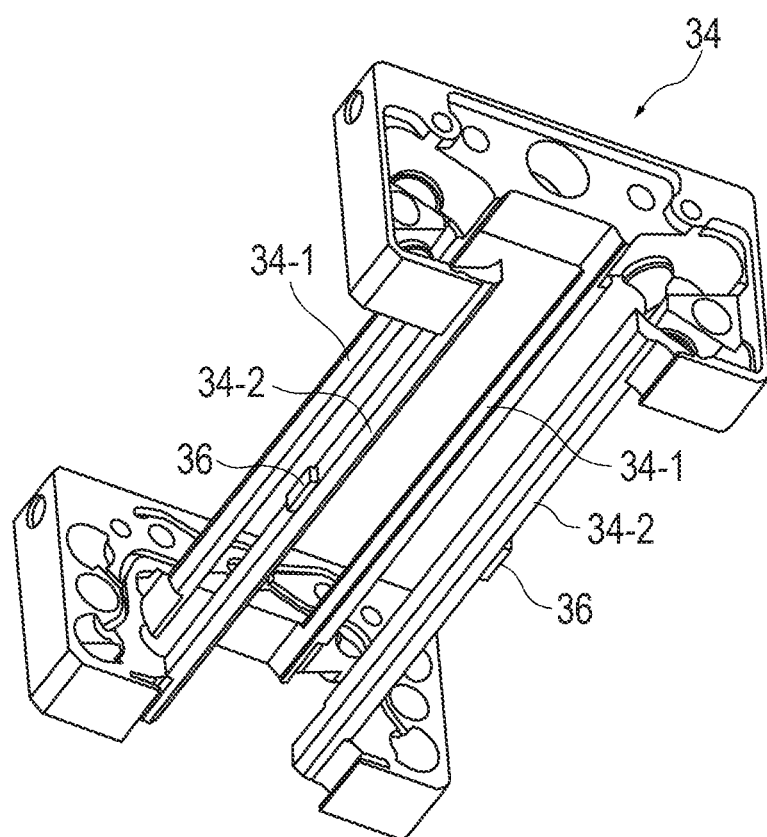
FIG. 10 is a perspective view of a ball retainer of the motion guide apparatus of the second embodiment of the present invention.

As illustrated in a perspective view of the ball retainer 34 of FIG. 10, a projection 36 touching the block body 33 is famed integrally with a center part of the lower retaining portion 34-2 in the length direction in such a manner that the center part of the lower retaining portion 34-2 bends toward the track rail 1. The shape of the projection 36 is not particularly limited, and can be set in various shapes such as a square and a round. The number of the projections 36 is not particularly limited, either, and can beset to one, two, three, and so forth. The shape of the projection 36 and its number are determined in such a manner as to correct a bend of the lower retaining portion 3 4-2 and make the lower retaining portion 34-2 straight. The projection 36 can also be provided to the upper retaining portion 34-1.

Figure 11:
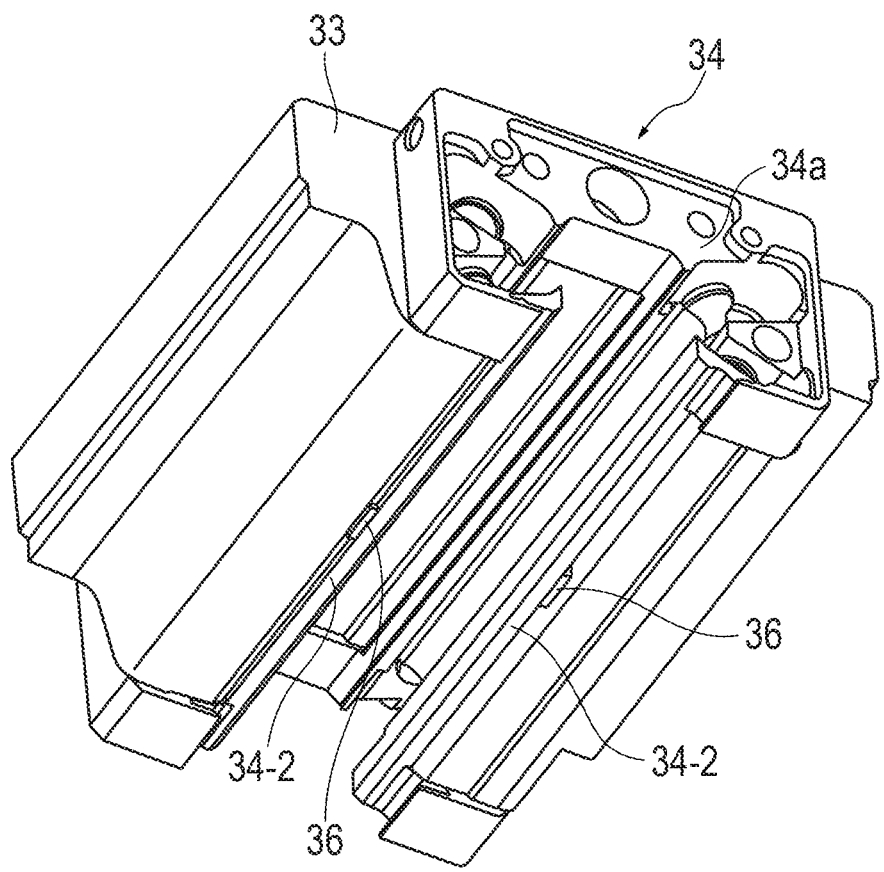
FIG. 11 is a perspective view of the block and the ball retainer of the motion guide apparatus of the second embodiment of the present invention.

FIG. 11 illustrates a state of the block body 33 with the incorporated ball retainer 34. The center part of the lower retaining portion 34-2 in the length direction is provided with the projection 36 touching the block body 33. Accordingly, it is possible to control the bending of the lower retaining portion 34-2 and, even if a warp or distortion occurs in the lower retaining portion 34-2 depending on the molding conditions, prevent the balls 6 from falling off. Moreover, when the lid member 35 is coupled by a screw or the like to the block body 33 (refer to FIG. 9), even if the lower retaining portion 34-2 bends due to a space between the block body 33 and the end plate 34a, it is possible to prevent the balls 6 from falling off.

The present invention is not limited to concretization of the above embodiments, and can be concretized in various embodiments within the scope that does not change the gist of the present invention.

In the above embodiments, the example where a ball is used as the rolling element has been described. However, a roller can also be used as the rolling element.

In the above embodiments, a full-ball type of motion guide apparatus where a spacer is not placed between balls has been described. However, a spacer can also be placed between balls.

In the above first embodiment, the example where three or two retaining portions are provided to each of the left and right sides of the block has been described. However, it is simply required to have at least one retaining portion.

The present description is based on Japanese Patent Application No. 2015-079914 filed on Apr. 9, 2015, the entire content of which is incorporated herein.

REFERENCE SIGNS LIST

1 . . . Track rail (track member), 1a . . . Ball rolling groove (rolling element rolling portion), 2 . . . Block (movable body), 2a . . . Loaded ball rolling groove (loaded rolling element rolling portion), 3 . . . Block body, 4 . . . Ball retainer (rolling element retainer), 4-1 . . . Upper retaining portion, 4-2 . . . Middle retaining portion, 4-3 . . . Lower retaining portion, 4a . . . End plate, 4b . . . Retaining portion, 5 . . . Lid member, 6 . . . Ball (rolling element), 7, 8 . . . Opening, 21, 22, 23, 24 . . . Padding portion (fall prevention portion), 26. . . Projection (fall prevention portion), 32 . . . Block, 33 . . . Block body, 33-1 . . . Middle retaining portion, 33a, 33b . . . Loaded ball rolling groove, 34 . . . Ball retainer, 34-1 . . . Upper retaining portion, 34-2 . . . Lower retaining portion, 34a . . . End plate, 34b . . . Retaining portion, 35 . . . Lid member, 36 . . . Projection

The invention claimed is:

1. A motion guide apparatus including
a track member having a rolling element rolling portion extending in a length direction,
a movable body, having a loaded rolling element rolling portion facing the rolling element rolling portion of the track member, to be assembled to the track member in such a manner as to be movable in the length direction,
a plurality of rolling elements placed between the track member and the loaded rolling element rolling portion of the movable body in such a manner as to be capable of rolling motion, and
a rolling element retainer incorporated in the movable body, the rolling element retainer being a resin molded product and having at least one retaining portion, extending along the loaded rolling element rolling portion, to prevent the rolling elements from falling out of the movable body, the motion guide apparatus comprising
a fall prevention portion in a center part of the at least one retaining portion in the length direction, configured to reduce a width of an opening between at least two retaining portions or between the at least one retaining portion and the movable body,
wherein the fall prevention portion includes a padding portion which is resin molded integrally with the at least one retaining portion, the padding portion rising in such a manner as to reduce the width of the opening.

2. A motion guide apparatus including
a track member having a rolling element rolling portion extending in a length direction,
a movable body, having a loaded rolling element rolling portion facing the rolling element rolling portion of the track member, to be assembled to the track member in such a manner as to be movable in the length direction,
a plurality of rolling elements placed between the track member and the loaded rolling element rolling portion of the movable body in such a manner as to be capable of rolling motion, and
a rolling element retainer incorporated in the movable body, the rolling element retainer having at least one retaining portion, extending along the loaded rolling element rolling portion, to prevent the rolling elements from falling out of the movable body, the motion guide apparatus comprising
a fall prevention portion in a center part of the at least one retaining portion in the length direction, configured to reduce a width of an opening between at least two retaining portions or between the at least one retaining portion and the movable body,
wherein the fall prevention portion includes a projection integrated with the at least one retaining portion, the projection touching the movable body in such a manner that the center part of the at least one retaining portion bends toward the track member.

3. The motion guide apparatus according to claim 2, wherein assuming that the track member is placed on a horizontal plane, and viewed from the length direction,
the movable body includes an upper loaded rolling element rolling portion and a lower loaded rolling element rolling portion on each of left and right sides of the movable body,
the at least one retaining portion includes an upper retaining portion placed above the upper loaded rolling element rolling portion, and a lower retaining portion placed below the lower loaded rolling element rolling portion, the upper and lower retaining portions are formed integrally with end plates placed on both end surfaces of the movable body in a travel direction with respect to the track member, and the projection is provided on at least one of the upper retaining portion and the lower retaining portion.

4. The motion guide apparatus according to claim 2, wherein assuming that the track member is placed on a horizontal plane, and viewed from the length direction, the movable body includes an upper loaded rolling element rolling portion and a lower loaded rolling element rolling portion on each of left and right sides of the movable body, the at least one retaining portion includes an upper retaining portion placed above the upper loaded rolling element rolling portion, a middle retaining portion placed between the upper loaded rolling element rolling portion and the lower loaded rolling element rolling portion, and a lower retaining portion disposed below the lower loaded rolling element rolling portion, and the upper retaining portions, the middle retaining portions, and the lower retaining portions are formed integrally with end plates placed on both end surfaces of the movable body in a travel direction with respect to the track member.

5. A motion guide apparatus including a track member having a rolling element rolling portion extending in a length direction, a movable body, having a loaded rolling element rolling portion facing the rolling element rolling portion of the track member, to be assembled to the track member in such a manner as to be movable in the length direction, a plurality of rolling elements placed between the track member and the loaded rolling element rolling portion of the movable body in such a manner as to be capable of rolling motion, and a rolling element retainer incorporated in the movable body, the rolling element retainer having at least one retaining portion, extending along the loaded rolling element rolling portion, to prevent the rolling elements from falling out of the movable body, the motion guide apparatus comprising a fall prevention portion provided only in a center part of the at least one retaining portion in the length direction, configured to reduce a width of an opening between at least two retaining portions or between the at least one retaining portion and the movable body, wherein assuming that the track member is placed on a horizontal plane, and viewed from the length direction, the movable body includes an upper loaded rolling element rolling portion and a lower loaded rolling element rolling portion on each of left and right sides of the movable body, the at least one retaining portion includes an upper retaining portion placed above the upper loaded rolling element rolling portion, a middle retaining portion placed between the the upper loaded rolling element rolling portion and the lower loaded rolling element rolling portion, and a lower retaining portion disposed below the lower loaded rolling element rolling portion, and the upper retaining portions, the middle retaining portions, and the lower retaining portions are formed integrally with end plates placed on both end surfaces of the movable body in a travel direction with respect to the track member.

6. The motion guide apparatus according to claim 5, wherein the fall prevention portion includes a padding portion integrated with the at least one retaining portion, the padding portion rising in such a manner as to reduce the width of the opening, and the padding portion is provided on each of the upper retaining portion, the middle retaining portion, and the lower retaining portion.

7. The motion guide apparatus according to claim 6, wherein the fall prevention portion includes a projection integrated with the at least one retaining portion, the projection touching the movable body in such a manner that the center part of the at least one retaining portion bends toward the track member, and the projection is provided on at least one of the upper retaining portion, the middle retaining portion, and the lower retaining portion.

8. A motion guide apparatus including a track member having a rolling element rolling portion extending in a length direction, a movable body, having a loaded rolling element rolling portion facing the rolling element rolling portion of the track member, to be assembled to the track member in such a manner as to be movable in the length direction, a plurality of rolling elements placed between the track member and the loaded rolling element rolling portion of the movable body in such a manner as to be capable of rolling motion, and a rolling element retainer incorporated in the movable body, the rolling element retainer having at least one retaining portion, extending along the loaded rolling element rolling portion, to prevent the rolling elements from falling out of the movable body, the motion guide apparatus comprising a fall prevention portion in a center part of the at least one retaining portion in the length direction, configured to reduce a width of an opening between at least two retaining portions or between the at least one retaining portion and the movable body, wherein the fall prevention portion includes a padding portion integrated with the at least one retaining portion, the padding portion rising in such a manner as to reduce the width of the opening, wherein assuming that the track member is placed on a horizontal plane, and viewed from the length direction, the movable body includes an upper loaded rolling element rolling portion and a lower loaded rolling element rolling portion on each of left and right sides of the movable body, the at least one retaining portion includes an upper retaining portion placed above the upper loaded rolling element rolling portion, a middle retaining portion placed between the upper loaded rolling element rolling portion and the lower loaded rolling element rolling portion, and a lower retaining portion disposed below the lower loaded rolling element rolling portion, and the upper retaining portions, the middle retaining portions, and the lower retaining portions are formed integrally with end plates placed on both end surfaces of the movable body in a travel direction with respect to the track member.

9. The motion guide apparatus according to claim 8, wherein
the padding portion is provided on each of the upper retaining portion, the middle retaining portion, and the lower retaining portion.

10. The motion guide apparatus according to claim 9, wherein
the fall prevention portion includes a projection integrated with the at least one retaining portion, the projection touching the movable body in such a manner that the center part of the at least one retaining portion bends toward the track member, and
the projection is provided on at least one of the upper retaining portion, the middle retaining portion, and the lower retaining portion.

* * * * *